United States Patent
Suneya

(10) Patent No.: US 8,312,352 B2
(45) Date of Patent: Nov. 13, 2012

(54) COMMUNICATION APPARATUS AND COMMUNICATION METHOD

(75) Inventor: Toru Suneya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 417 days.

(21) Appl. No.: 12/632,606

(22) Filed: Dec. 7, 2009

(65) Prior Publication Data

US 2010/0146352 A1    Jun. 10, 2010

(30) Foreign Application Priority Data

Dec. 9, 2008  (JP) ................. 2008-313400

(51) Int. Cl.
G06F 11/00  (2006.01)
(52) U.S. Cl. ..................... 714/776; 714/748
(58) Field of Classification Search .......... None
See application file for complete search history.

(56) References Cited

U.S. PATENT DOCUMENTS 6,567,948 B2 *  5/2003  Steele et al. ............. 714/746
7,930,617 B1 *  4/2011  Gass et al. .............. 714/784

FOREIGN PATENT DOCUMENTS

JP  2004-159042 A  6/2004

* cited by examiner

Primary Examiner — Michael Maskulinski
(74) Attorney, Agent, or Firm — Canon USA Inc. IP Division

(57) ABSTRACT

A communication apparatus which can communicate a data packet, a recovery packet used to recover a data packet that failed to be communicated, and a retransmit packet for the data packet that failed to be communicated, the communication apparatus includes a determining unit configured to determine, when a first packet of a plurality of packets that failed to be communicated is normally communicated, a packet that can be recovered, from among the plurality of the packets that failed to be communicated based on the first packet and the normally communicated recovery packet, and a retransmit determination unit configured to determine not to retransmit at least a part of the plurality of packets that can be recovered, when the first data packet is retransmitted which is determined to recover a plurality of data packets if it is normally communicated.

16 Claims, 11 Drawing Sheets

FIG. 8

| NUMBER OF SEQUENTIAL RECOVERIES | NUMBER OF RETRANSMITTED PACKETS |
|---|---|
| 1 | 1 |
| 2 | 1 |
| 3 | 2 |
| 4 | 2 |
| 5 | 3 |
| 6 | 3 |

COMMUNICATION APPARATUS AND COMMUNICATION METHOD

BACKGROUND OF THE INVENTION

1. Field of the Invention

The present invention relates to a packet communication method.

2. Description of the Related Art

Generally, technologies for guaranteeing a communication band and a communication speed and for compensating communication errors over network are collectively called Quality of Service (QoS). More specifically, Automatic Repeat Request (ARQ) and Forward Error Correction (FEC) are known and used in communicating voice and moving image data in the Real-time Transport Protocol (RTP) format. ARQ is a technique for retransmitting a packet that was not received by a reception device due to communication error. FEC is a technique for recovering a packet that was not normally received due to communication error, using redundant data attached to the data.

Hybrid ARQ, the combination of ARQ and FEC, is also known. For example, Japanese Patent Application Laid-Open No. 2004-159042 discusses retransmission of only a packet that could not be recovered using FEC, by ARQ.

The retransmitted packet, however, increases the volume of communication.

For example, when there are a number of missing packets that could not be recovered using FECs, the retransmission of all of the missing packets may drastically increase a volume of communication. Such missing packets may be caused by congestion on the network. In such a case, it is desirable to decrease the volume of communication as much as possible.

SUMMARY OF THE INVENTION

The present invention is directed to suppress increase of volume of communication due to retransmitted packets.

According to an aspect of the invention, a communication apparatus which can communicate a data packet, a recovery packet used to recover a data packet that failed to be communicated, and a retransmit packet for the data packet that failed to be communicated, the communication apparatus includes a determining unit configured to determine, when a first packet of a plurality of packets that failed to be communicated is normally communicated, a packet that can be recovered, from among the plurality of the packets that failed to be communicated based on the first packet and the normally communicated recovery packet, and a retransmit determination unit configured to determine not to retransmit at least a part of the plurality of packets that can be recovered, when the first data packet is retransmitted which is determined to recover a plurality of data packets if it is normally communicated.

Further features of the present invention will become apparent from the following description of exemplary embodiments by referring to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a table illustrating correspondence between a number of sequential recoveries and a number of retransmitted data packets.

DESCRIPTION OF THE EMBODIMENTS

Figure 1:
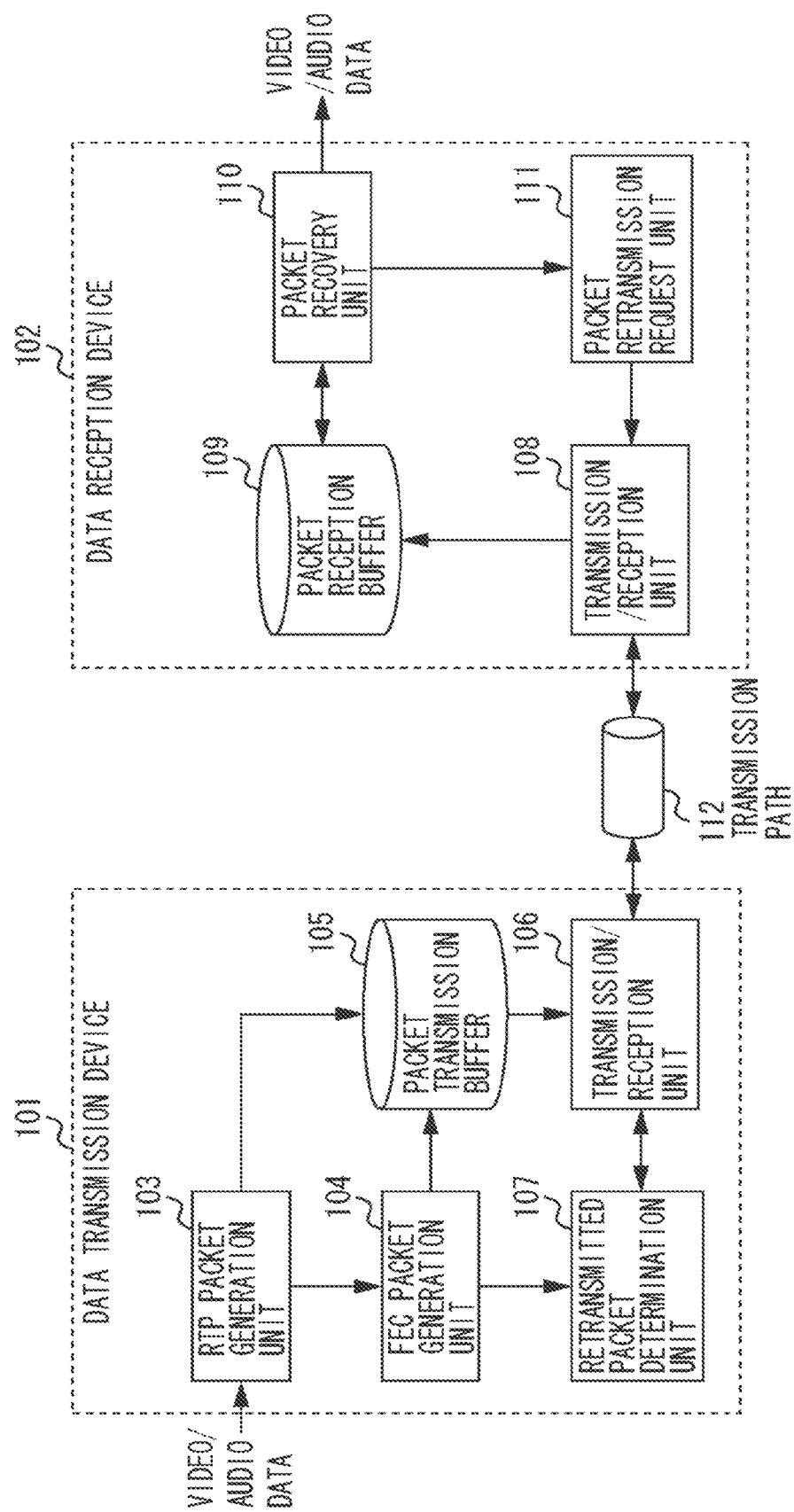
FIG. 1 is a block diagram illustrating a basic configuration of a data transmission device and a data reception device of a first exemplary embodiment.

Various exemplary embodiments, features, and aspects of the invention will be described in detail below by referring to the drawings.

FIG. 1 is a block diagram illustrating a basic configuration of a transmission/reception system including a data transmission device 101 and a data reception device 102 of a first exemplary embodiment. In the present exemplary embodiment, the data transmission device 101 transmits data packets including video and voice and a recovery packet (FEC packet) to the data reception device 102. The FEC packet is used to recover the data packet that has failed to be communicated (missing data packet). The failed data packet (missing data packet) is a data packet which has been lost in a transmission path, for example. The data reception device 102 transmits a packet for requesting retransmission of the missing data packet that could not be recovered using the recovery packet, to the data transmission device 101. Both of the data transmission device 101 and the data reception device 102 are communication apparatuses for packet communication.

As shown in FIG. 1, the data transmission device 101 includes an RTP packet generation unit 103, an FEC packet generation unit 104, a packet transmission buffer 105, a transmission/reception unit 106, and a retransmit packet determination unit 107. The data reception device 102 includes a transmission/reception unit 108, a packet reception buffer 109, a packet recovery unit 110, and a packet retransmission request unit 111.

The data transmission device 101 is communicably connected to the data reception device 102 via a transmission path 112.

The RTP packet generation unit 103 classifies video data and/or voice data input from an external device into data segments each having an appropriate size for communication, and attaches a header to each of the segments required for communication, to generate RTP data packets. The RTP packet generation unit 103 outputs the generated data packets to the FEC packet generation unit 104 and the packet transmission buffer 105.

The FEC packet generation unit 104 generates a recovery packet (FEC packet) for recovering a data packet that is generated by the RTP packet generation unit 103 when the generated data packet is lost. In other words, the FEC packet generation unit 104 generates a recovery packet (FEC packet) that is communicated so that the data reception device 102 recovers a packet (missing data packet) that has failed to be communicated. For example, the FEC packet generation unit 104 generates six FEC packets R1 to R6 from nine data packets 201 A to I by error correction coding, as shown in FIG. 2.

The typical error correction coding uses parity (XOR) code, BCH code, and Reed-Solomon code. In the present exemplary embodiment, parity code is used to generate FEC packets, but the error correction code used is not limited to parity code and may be other code including those listed above.

Figure 2:
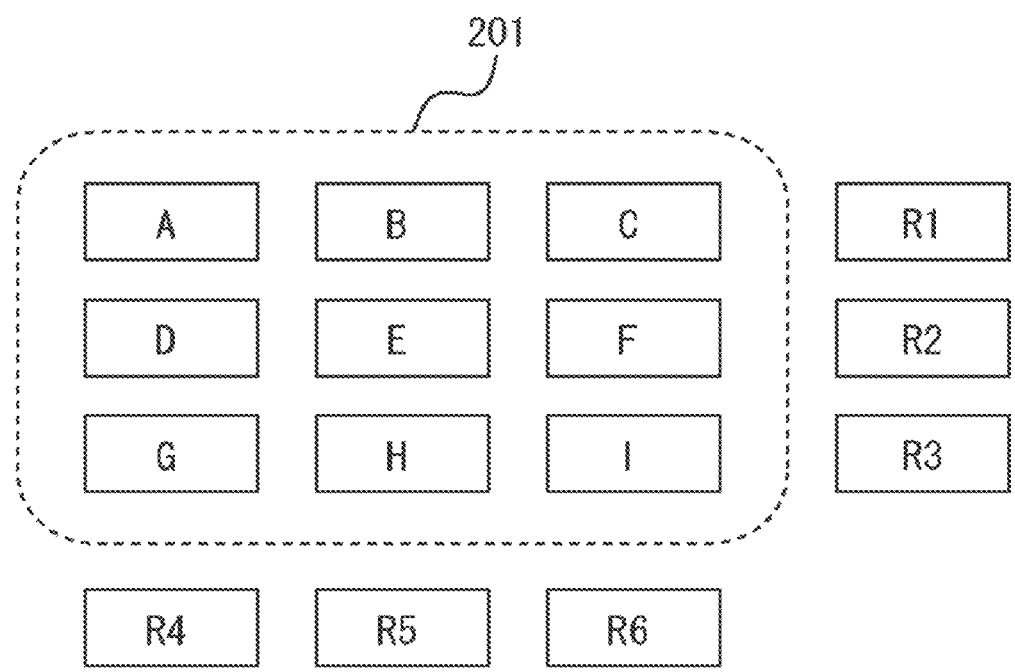
FIG. 2 illustrates an example of a pattern for generating FEC packets from data packets by error correction coding.

In FIG. 2, the FEC packets R1 to R3 are generated based on the three data packets in each of the rows of the data packets 201 by an exclusive OR (XOR) operation, respectively. The FEC packets R4 to R6 are generated based on the three data packets in each of the columns of the data packets 201 by the XOR operation, respectively.

The FEC packet generation unit 104 of the present exemplary embodiment arranges the data packets generated by the RTP packet generation unit 103 in a matrix as shown in FIG. 2. Then, the FEC packet generation unit 104 generates one FEC packet for a plurality of data packets arranged in one row, and also one FEC packet for the plurality of data packets arranged in one column. Accordingly, the FEC packet generation unit 104 of the present exemplary embodiment generates FEC packets so that each of the data packets belongs to two recovery groups.

When one data packet in one recovery group is missing, the other two data packets and the corresponding FEC packet are used to recover the missing data packet by the XOR operation. For example, when the data packet A is missing, the data packets B and C and the FEC packet R1 are used to recover the data packet A. Each of the data packets may belong to a single recovery group, or three or more recovery groups. One recovery group may include data packets in any number other than three.

Figure 3:
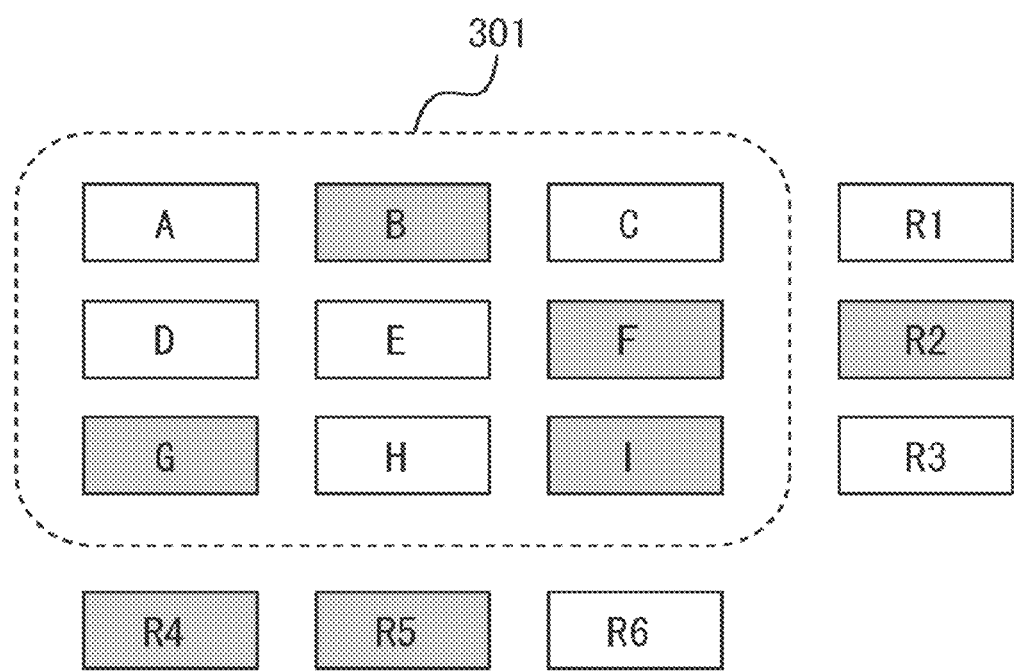
FIG. 3 illustrates an example of data packets and FEC packets after error correction coding, some of the packets being missing.

A method for recovering a plurality of missing packets is described below by referring to FIG. 3. In FIG. 3, it is assumed that the data packets B, F, G, and I and the FEC packets R2, R4, and R5 are missing. In this case, the missing data packet B is first recovered using the three packets, more specifically, the normally received data packets A and C and the FEC packets R1, by the XOR operation.

In contrast, the data packets F, G, and I each is in a row that misses two packets and in a column that misses two packets, and cannot be recovered in the manner described above. For example, however, if the data packet F among the missing data packets F, G and I is retransmitted and normally received, the data packet I can be recovered using a combination of packets in the column. In addition, the data packet G can be recovered using the combination of packets in the row, based on the recovered data packet I.

When the data packet B is recovered, the three data packets remain missing. However, these three data packets can be recovered by the retransmission of the data packet F for example, without the retransmission of all of the three data packets.

When a retransmitted data packet is normally communicated, a number of missing data packets that can be recovered in the data reception device 102 varies according to the circumstances.

As shown in FIG. 3, the retransmission of any one of the missing data packets F, G and I leads to recovery of the other two missing data packets. For example, when the data packet F is retransmitted, the data packet I can be recovered using the data packets C and F and the FEC packet R6. Then, the data packet G can be recovered using the data packets H and I and the FEC packet R3. Similarly, the retransmission of the data packet G or I also results in the recovery of all of the missing data packets in sequence. Herein, the number of the data packets that are recovered in sequence is referred to as "a number of sequential recoveries". In the present exemplary embodiment, "the number of sequential recoveries" includes the retransmitted data packet and the data packets that can be recovered based on the retransmitted data packet. Thus, in the example of FIG. 3, each of the data packets F, G, and I has the number of sequential recoveries of three.

For example, the retransmission of the data packet B does not help the recovery of the other missing data packets, and the data packet B has the number of sequential recoveries of one.

Figure 7:
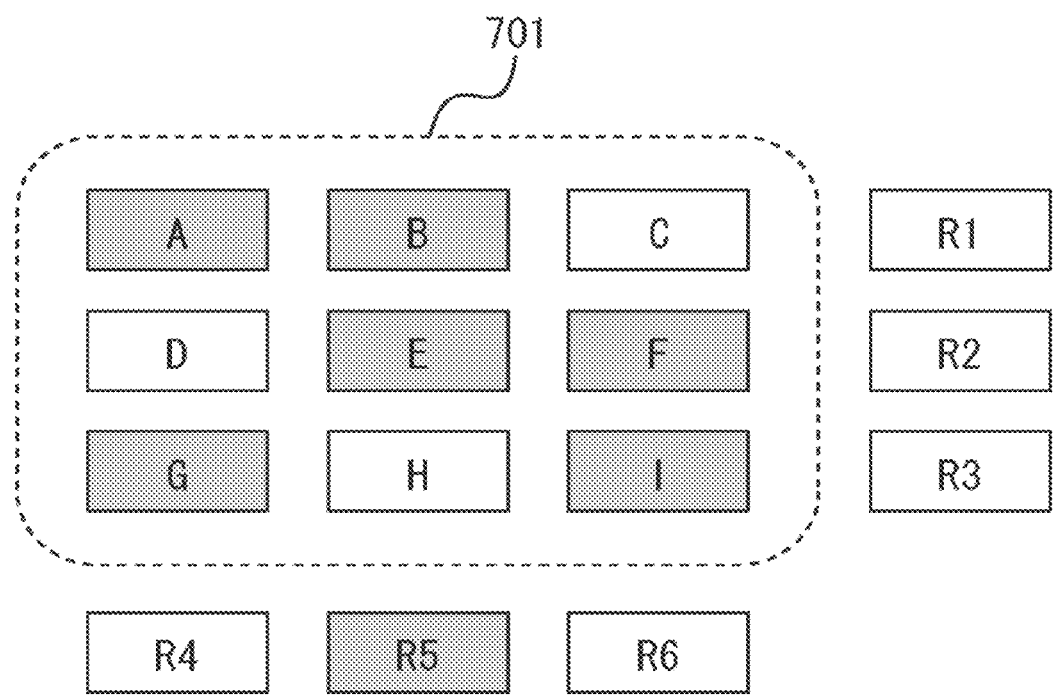
FIG. 7 illustrates another example of data packets and FEC packets after error correction coding, some of the packets being missing.

Another pattern that is different from that of FIG. 3 is described below by referring to FIG. 7. In FIG. 7, the data packets A, B, E, F, G, and I among the nine data packets 701 are missing. In this case, for example, when the data packet A is normally retransmitted, the data packets B and G can be recovered by error correction decoding in the row and column directions. The data packet I can be recovered by error correction decoding in the row direction. Then, the data packet F can be recovered by error correction decoding in the column direction. Finally, the data packet E can be recovered by error correction decoding in the row direction.

The sequential recoveries can be performed similarly in the above pattern when a missing data packet other than the data packet A is normally communicated. In other words, the retransmission of any of the missing data packets leads to the sequential recoveries of the other missing data packets. Accordingly, each of the six missing data packets shown in FIG. 7 has the number of sequential recoveries of six.

When a plurality of data packets are missing and there are packets that can be sequentially recovered as described above, the retransmit packet determination unit 107 determines a packet to be retransmitted from among the missing data packets. In other words, when it is determined that the plurality of missing data packets can be sequentially recovered by the normal retransmission of one of the missing data packets, the retransmit packet determination unit 107 does not retransmit at least a part of the plurality of recoverable data packets. The retransmit packet determination unit 107 determines the recoverable missing data packets based on identification information about missing data packets and missing FEC packets which are included in a retransmission request packet transmitted from the data reception device 102.

More specifically, the retransmit packet determination unit 107 determines packets that can be recovered when a first packet from among the plurality of packets that have failed to be communicated is normally communicated. When the first packet that is determined to recover the plurality of packets when it is normally communicated is retransmitted, the retransmit packet determination unit 107 determines a retransmit packet so that at least part of the plurality of recoverable packets is not retransmitted.

The retransmit packet determination unit 107 of the present exemplary embodiment also places higher importance on a data packet that has a larger number of sequential recoveries. If the data packet that has a larger number of sequential recoveries is retransmitted and normally communicated, a larger number of missing data packets can be recovered. But if the retransmitted data packet is missing, the larger number of missing data packets cannot be recovered. Thus, the retransmit packet determination unit 107 places higher importance on the data packet that has a larger number of sequential recoveries, and retransmits a larger number of data packets. FIG. 8 illustrates correspondence between the number of sequential recoveries and the number of retransmit packets. The correspondence between the number of sequential recoveries and the number of retransmitted data packets are not limited to those in FIG. 8.

In the present exemplary embodiment, the group of missing data packets that can be used for mutual sequential recoveries is referred to as "sequential recovery group." The missing data packets in the same sequential recovery group have the same number of sequential recoveries.

When there is a missing data packet having a certain number of sequential recoveries, it means that missing data packets that have the certain number of sequential recoveries exist at least a number which is equal to the number of sequential recoveries. In other words, for example, if there is a missing data packet that has the number of sequential recoveries of three, at least two other missing data packets that each has the number of sequential recoveries of three exist. Further, when any one of the data packets among these three missing data packets is normally retransmitted, the other two missing data packets can be recovered, it is determined that these three missing data packets are in the same sequential recovery group.

For example, in a case where normal reception of a missing data packet A leads to the recovery of a missing data packet B, and the normal reception of the missing data packet B leads to the recovery of the missing data packet A, the missing data packets A and B are determined as in the same sequential recovery group. The missing data packets in the same sequential recovery group satisfy the following condition. When any one of the missing data packets in an arbitrary sequential recovery group is normally communicated, the other missing data packets in the sequential recovery group can be recovered.

In the above examples illustrated in FIGS. 3 and 7, there is only one sequential recovery group. In the examples in FIGS. 3 and 7, the normal communication of one of the missing data packets in a sequential recovery group leads to the recovery of all of the other missing data packets in the sequential recovery group. In the present exemplary embodiment, as shown in FIGS. 3 and 7, when the missing packets all belong to the same sequential recovery group, the number of packets to be retransmitted and the retransmit packets are determined according to the number of sequential recoveries of the sequential recovery group. In contrast, processing performed when the missing packets may belong to a plurality of sequential recovery groups is described below in a third exemplary embodiment. A sequential recovery group differs from the above described recovery group.

As shown in FIG. 8, the retransmit packet determination unit 107 selects one data packet to be retransmitted when the number of sequential recoveries is one or two. When there is a missing data packet that has the number of sequential recoveries of one, the missing data packet itself is determined to be retransmitted. When there is a missing data packet that has the number of sequential recoveries of two, the retransmit packet determination unit 107 determines to retransmit one of the two missing data packets in a sequential recovery group. Similarly for other missing patterns, the retransmit packet determination unit 107 determines the number of data packets to be retransmitted.

For example, for the missing pattern illustrated in FIG. 7, the missing data packets (data packets A, B, E, F, G, and I) each have the number of sequential recoveries of six, and belong to the same sequential recovery group. According to FIG. 8, the number of packets to be retransmitted for six sequential recoveries is three. In this case, although the normal retransmission of one of the missing data packets A, B, E, F, G and I leads to the recovery of the other missing data packets, the retransmit packet determination unit 107 retransmits three missing data packets.

According to the number of packets (the number of sequential recoveries) that can be recovered by the normal communication of a first packet, the retransmit packet determination unit 107 determines the number of packets that are retransmitted with the first packet from among the packets that can be recovered. Accordingly, the missing data packets can be recovered if a part of the retransmit packets is lost. The same data packet among the missing data packets may be retransmitted a plurality of times which facilitates the retransmission processing. Alternatively, a plurality of different packets in a sequential recovery group may be retransmitted. This facilitates the recovery processing when a plurality of retransmit packets is normally received.

Further, when the number of sequential recoveries is equal to or more than a predetermined number, the number of retransmit packets may be smaller than the number of missing data packets. More specifically, as shown in FIG. 8, the number of retransmit packets is one for two missing data packets when the number of sequential recoveries is two. Alternatively, the number of retransmit packets in FIG. 8 may be set to be smaller than the number of missing data packets when the number of sequential recoveries is four or more. In this case, all of the missing data packets are retransmitted when the number of sequential recoveries is equal to a predetermined number or less (e.g., three).

Figure 11:
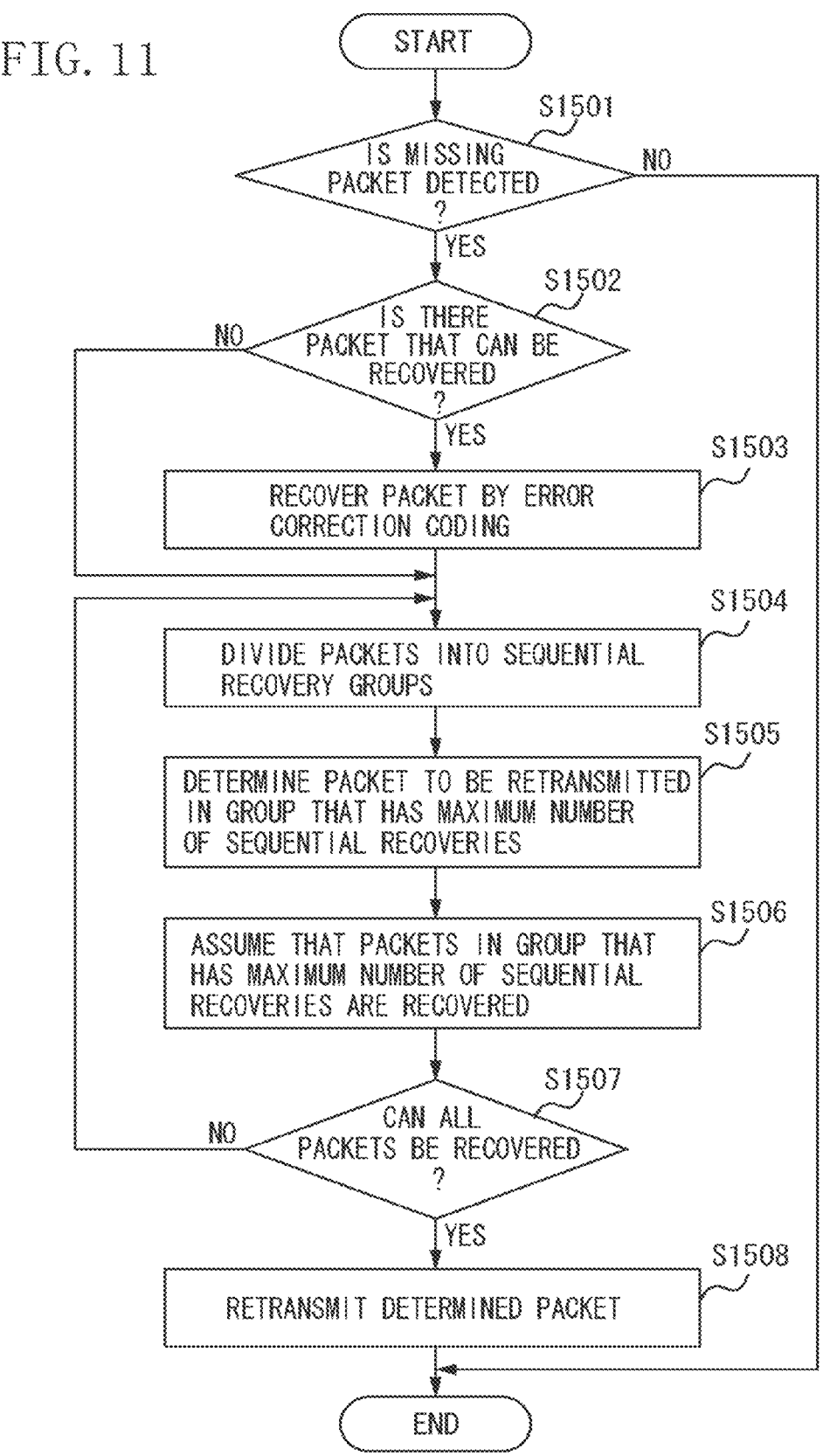
FIG. 11 is a flow chart illustrating processing in a third exemplary embodiment for determining a data packet to be transmitted.

Next, determination of a retransmit packet in the present exemplary embodiment is described below by referring to the flow chart of FIG. 11 and FIG. 4. FIG. 11 is a flow chart illustrating the determination of a retransmit packet by the retransmit packet determination unit 107 of the present exemplary embodiment.

Figure 4:
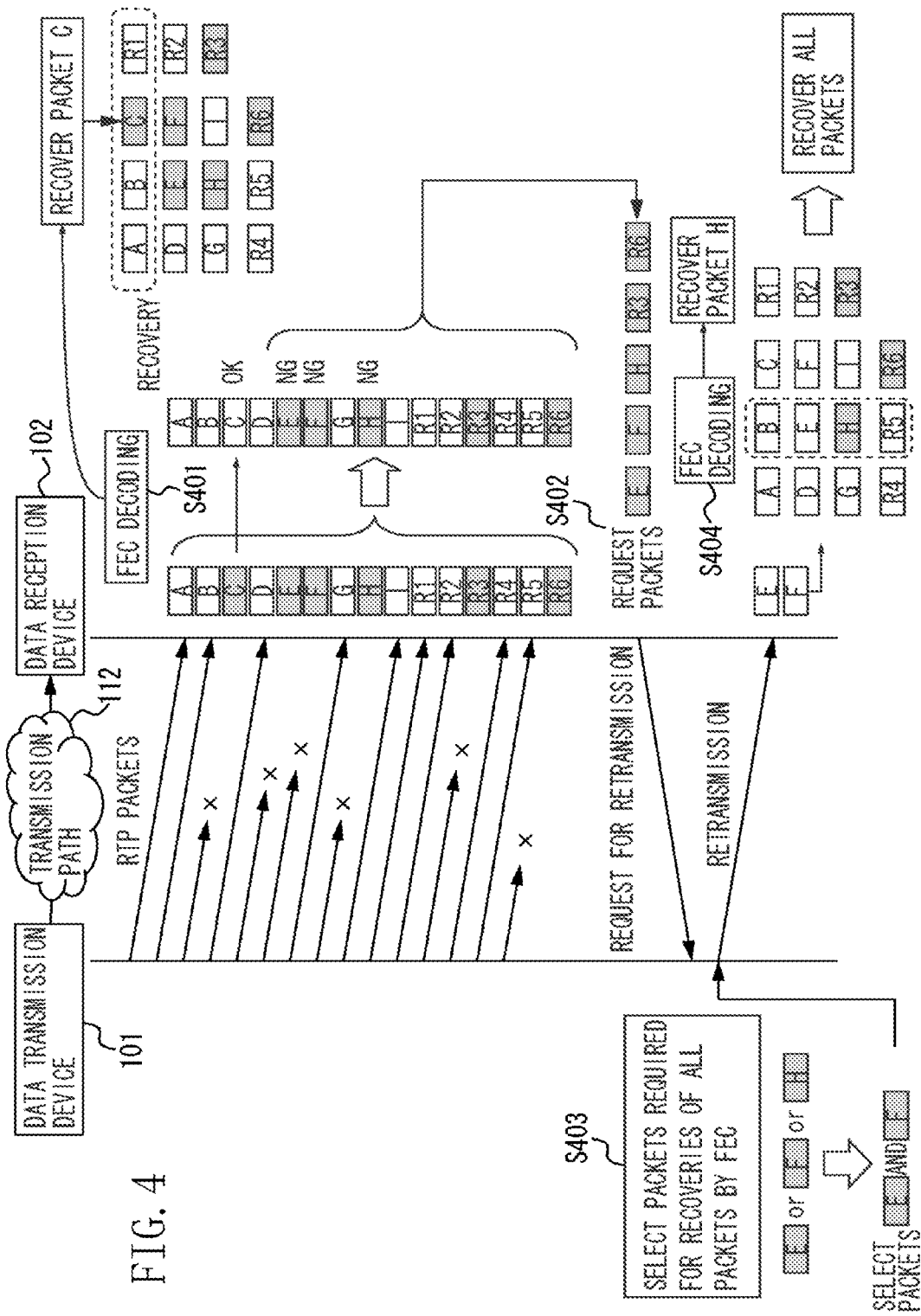
FIG. 4 illustrates a series of processes in the first exemplary embodiment from occurrence of packet lost in a transmission path to recovery of the lost packets by retransmission.

FIG. 4 illustrates a specific example of processing for recovering packets that are transmitted by the data transmission device 101 and missing in a transmission path.

In step S1501 in FIG. 11, the retransmit packet determination unit 107 of the data transmission device 101 detects the absence of transmitted packets. The detection is performed based on information about missing packets in the retransmission request packets transmitted from the data reception device 102.

As shown in FIG. 4, the data transmission device 101 transmits, for example, data packets A to I, and FEC packets R1 to R6 to the data reception device 102. It is assumed here that the data packets C, E, F and H and the FEC packets R3 and R6 are missing in the transmission path 112.

The packet recovery unit 110 of the data reception device 102 refers a sequence number at a header of each packet to check for a missing packet. When a missing data packet is detected, the packet recovery unit 110 determines whether the missing data packet can be recovered using the other normally received data packets and FEC packet, and recovers the missing data packet by error correction coding. In step S401 in FIG. 4, the missing data packet C is recovered using the normally received data packets A and B and FEC packet R1.

When there is the missing data packet that cannot be recovered by the FEC packet, the data reception device 102 transmits a retransmission request packet that includes the information (sequence number) about the missing data packet and missing FEC packet to the data transmission device 101. In step S402 in FIG. 4, the retransmission request packet including information about the missing data packets E, F, and H and the missing FEC packets R3 and R6 is transmitted.

The data transmission device 101 does not perform the processing in steps S1502 and S1503, which will not be described here.

In step S1504 (procedure for determination), the retransmit packet determination unit 107 classifies the missing data packets (E, F, and H) into sequential recovery groups. For classifying the packets into sequential recovery groups, the retransmit packet determination unit 107 determines the other missing data packet that can be recovered when each one of the missing data packets is normally communicated. For example, the retransmit packet determination unit 107 determines the missing data packet that can be recovered if the missing data packet E is normally communicated. More specifically, in step S1504, the retransmit packet determination unit 107 determines the missing data packet that can be recovered when a first packet (missing data packet E) which is one of a plurality of packets (missing data packets) that have failed to be communicated is normally communicated. The retransmit packet determination unit 107 determines the missing data packet that can be recovered based on the missing data packet (first packet) that is assumed to be normally communicated, the normally communicated data packets and the FEC packets.

In FIG. 4, there is one sequential recovery group. Thus, normal transmission of any one of the missing data packets E, F and H can lead to the recovery of all of the missing data packets. Each of the missing data packets has the number of sequential recoveries of three. After the retransmit packet determination unit 107 classifies the missing data packets into the sequential recovery groups, the processing proceeds to step S1505.

In step S1505 (procedure for determination), the retransmit packet determination unit 107 determines a missing data packet to be retransmitted from among the missing data packets in a sequential recovery group which has a maximum number of sequential recoveries. In the example illustrated in FIG. 4, the retransmit packet determination unit 107 determines a data packet to be retransmitted from among the missing data packets E, F and H. A number of the data packet to be retransmitted is determined based on the table such as that of FIG. 8. When a plurality of packets can be recovered using a retransmit packet and an FEC packet, the retransmit packet determination unit 107 determines the packet to be retransmitted from among a plurality of recoverable packets in which at least a part of the packet is removed. In step S403 in FIG. 4, the data packets E and F are determined to be retransmitted, so that the missing data packet H is not retransmitted.

In step S1505, when a first packet which is determined that a plurality of packets can be recovered by normally communication thereof is retransmitted, the retransmit packet determination unit 107 determines a retransmit packet so that at least apart of the plurality of recoverable packets are not retransmitted. In other words, in step S1505, when the first packet which is determined that the plurality of packets can be recovered by the normally communication thereof is retransmitted, the retransmit packet determination unit 107 determines not to retransmit at least a part of the plurality of recoverable packets. After the determination of the retransmit packet, the processing proceeds to step S1506.

In step S1506, the retransmit packet determination unit 107 assumes that all of the missing packets in the sequential recovery group from which the retransmit packet is determined are recovered, and the processing proceeds to step S1507.

In step S1507, the retransmit packet determination unit 107 determines whether all of the missing packets are assumed to be recovered. If the retransmit packet determination unit 107 determines that all of the missing packets are assumed to be recovered (YES in step S1507), the processing proceeds to step S1508. Whereas if the retransmit packet determination unit 107 determines that there is a missing packet not yet recovered (NO in step S1507), the processing returns to step S1504. In the example illustrated in FIG. 4, it is assumed that the retransmission of the data packets E and F leads to the recovery of all of the missing data packets, and the processing proceeds to step S1508. When all of the missing data packets are not necessarily recovered, the retransmit packet determination unit 107 determines whether the missing data packet that needs to be recovered is assumed to be recovered. When there is only one sequential recovery group as in FIG. 4, the processing in step S1507 may be omitted.

In step S1508, the retransmit packet determination unit 107 notifies the transmission/reception unit 106 of identification information (e.g., sequence number) of the retransmit packets determined in step S1505. The transmission/reception unit 106 reads the data of the retransmit packets from the packet transmission buffer 105 based on the identification information about the retransmit packets and transmits the retransmit packets to the data reception device 102. In FIG. 4, the data packets E and F among the missing data packets E, F and H are retransmitted.

The data reception device 102 recovers the missing data packet H using the data packets B and E and the FEC packet R5. In FIG. 4, both of the retransmitted data packets E and F are normally received, but the normal reception of one of the data packets can also lead to the recovery of all of the missing data packets. Only one data packet (e.g., data packet E) among the three missing data packet E, F, and H may be determined to be retransmitted twice, in addition to determining two different data packets (e.g., data packets E and F) as the retransmit packets as described above.

The number of retransmit packets for each number of sequential recoveries in the table illustrated in FIG. 8 may be all one, for example. In this case, if the retransmit packet is missing in the transmission path, the recovery of the other data packets cannot be achieved, but the number of packets to be retransmitted can be reduced. Accordingly, increase of the volume of communication due to the retransmission of missing packets can be efficiently reduced.

The number of retransmit packets may be determined according to a condition of the transmission path 112.

In the RTP packet communication such as that in the present exemplary embodiment, RTP Control Protocol (RTCP) is used to monitor a reception status of the packets.

In RTCP, packets which include transmission information or reception information are mutually transmitted between a packet transmission side and a packet reception side. The packet from the reception side to the transmission side is referred to as a receiver report. The receiver report includes information about an accumulated number of lost (missing) packets and received packets. Further, the receiver report also includes delay time information about time (delay time)

required for a packet to travel from the data transmission device 101 to the data reception device 102.

The retransmit packet determination unit 107 determines the condition of the transmission path 112 by analyzing the above information. More specifically, congestion along the transmission path 112 causes increase in a rate (error rate) of missing packets to transmitted packets, and increase in the time required for the packet transmission. Thus, the retransmit packet determination unit 107 of the present exemplary embodiment determines that congestion occurs when the error rate increases and the time (delay time) required for a packet to travel from the data transmission device 101 to the data reception device 102 increases. When it is determined that the congestion occurs in the transmission path 112, the retransmit packet determination unit 107 decreases the number of retransmit packets as compared to that when there is no congestion.

In other words, the retransmit packet determination unit 107 obtains the error rate according to a number of packets which failed in transmission (the number of missing packets). Then, when obtained second error rate is higher than a first error rate and a number of packets (the number of sequential recoveries) that are determined as recoverable is a first number of packets, the retransmit packet determination unit 107 determines the number of retransmit packets as follows.

The retransmit packet determination unit 107 determines the number of retransmit packets so that the number of retransmit packets is smaller than that in the case with the first error rate and the number of sequential recoveries is the first number of packets. Further, the retransmit packet determination unit 107 obtains delay time information about the delay time required for a packet to be transmitted and received. Then, the retransmit packet determination unit 107 determines the number of retransmit packets as follows, based on the delay time information and the number of packets that are determined as recoverable (the number of sequential recoveries).

When the delay time information about first delay time is obtained and then the delay time information about second delay time which is longer than the first delay time is obtained, and when the number of sequential recoveries is the first number of packets, the retransmit packet determination unit 107 determines a second number of packets as the number of retransmit packets.

In addition, after the delay time information about the first delay time is obtained, if the delay time information about third delay time which is longer than the second delay time is obtained, and the number of sequential recoveries is the first number of packets, the retransmit packet determination unit 107 determines a third number of packets as the number of retransmit packets. More specifically, the retransmit packet determination unit 107 determines the retransmit packets so that the third number of packets which is smaller than the second number are retransmitted, from among the packets that can be sequentially recovered.

The delay time information about the time (delay time) required for a packet to travel from the data transmission device 101 to the data reception device 102 may be based on Round Trip Time (RTT) or jitter information for example, but not limited thereto. Alternatively, the occurrence of congestion may be determined based on either the error rate or the delay time information.

As described above, the retransmit packet determination unit 107 increases the number of packets to be retransmitted when it is determined that there is no congestion along the transmission path 112, and decreases the number of packets to be retransmitted when it is determined that the congestion occurs in the transmission path 112. Accordingly, this configuration may increase the possibility of recovering all missing packets when there is no congestion along the path, and reduce the possibility of increasing congestion with the retransmit packets.

The above example has been described focusing on the recovery of all of the missing data packets, but all of the missing data packets may not be necessarily recovered. The retransmit packets may be determined so that a data packet which has higher priority is recovered, from among missing data packets.

The data packets which have higher priority include intra-frame compression data, for example. The intra-frame compression data is moving image data which is coded without referring to the other frame data. In contrast, inter-frame compression data includes moving image data which is coded by referring to the other frame data. The intra-frame data is likely to be referred to by data that is transmitted later. If the intra-data is not recovered, the missing data may adversely affect the later communication for a long time. Therefore, the retransmit packet determination unit 107 can determine a retransmit packet so that the data packet including intra-frame data can be recovered. More specifically, the retransmit packet determination unit 107 determines whether to retransmit a packet failed in transmission by checking whether the packet includes moving image data that is coded by referring to the other frame data. Accordingly, this configuration can reduce an effect due to the missing data packet, and an increase in volume of communication due to the retransmission of the missing packet.

The retransmit packet determination unit 107 may determine whether to recover all of the missing data packets, or only data packets which have higher priority, according to whether the transmission path 112 is in a congestion state or not. For example, when it is determined that there is congestion along the transmission path 112, the retransmit packet determination unit 107 retransmits a data packet for recovering intra-frame compression moving image data among the missing data packets. In contrast, when it is determined that no congestion occurs along the transmission path 112, the retransmit packet determination unit 107 determines a retransmitted data packet so that all of the missing data packets can be recovered. The determination of the occurrence of the congestion may be based on the error rate, the delay time information, or a combination thereof, for example.

More specifically, the retransmit packet determination unit 107 obtains the error rate according to the number of packets which failed in transmission (the number of missing packets). When the second error rate which is higher than the first error rate is obtained, the retransmit packet determination unit 107 determines a retransmit packet from among the packets failed in communication so that the packet that includes moving image data which is not coded by referring to the other frame data is retransmitted.

Further, the retransmit packet determination unit 107 obtains delay information (an amount of increased delay time) based on the time required for a packet to be transmitted and received. When the delay time information about first delay time is obtained and then the delay time information about second delay time which is longer than the first delay time is obtained, the retransmit packet determination unit 107 determines a retransmit packet regardless of intra-frame compression or inter-frame compression. More specifically, the retransmit packet determination unit 107 determines a retransmit packet so that a packet including intra-frame compression moving image data and a packet including inter-frame compression moving image data are retransmitted.

On the other hand, the retransmit packet determination unit 107 determines a retransmit packet so that a packet including intra-frame compression moving image data is retransmitted when the delay time information about third delay time which is longer than the second delay time is obtained after the delay time information about the first delay time is obtained.

Data to be prioritized may be determined, in addition to the intra-frame compression moving image data, according to a data position on a display screen or an amount of movement in the screen, for example. The retransmit packet determination unit 107 may set a plurality of stages of priority and determine a data packet to be retransmitted according to the congestion state and the order of priority. Accordingly, this configuration can reduce the effect due to the missing data packet when there is congestion along the path, and prevents worsening of the congestion with the retransmit packets.

As described above, the data transmission device 101 of the present exemplary embodiment determines a data packet that can be recovered when a data packet that has failed to be communicated (missing data packet) is normally communicated. When the data transmission device 101 retransmits the missing data packet that is determined to recover a plurality of missing data packets when it is normally communicated, the data transmission device 101 determines a retransmit packet so that at least a part of the missing data packets that can be recovered by the retransmitted data packet are not retransmitted.

This configuration can suppress the increase in the volume of communication due to the retransmission of the missing packets. Further, since the data transmission device 101 determines a packet to be retransmitted, an effect of the exemplary embodiment of the present invention can be obtained regardless of functions provided in the data reception device 102.

Next, a second exemplary embodiment of the present invention is described below, focusing on the difference from the first exemplary embodiment.

In the first exemplary embodiment, the data transmission device 101 determines a retransmit packet. In the present exemplary embodiment, a data reception device 502 determines a packet that requires retransmission.

Figure 5:
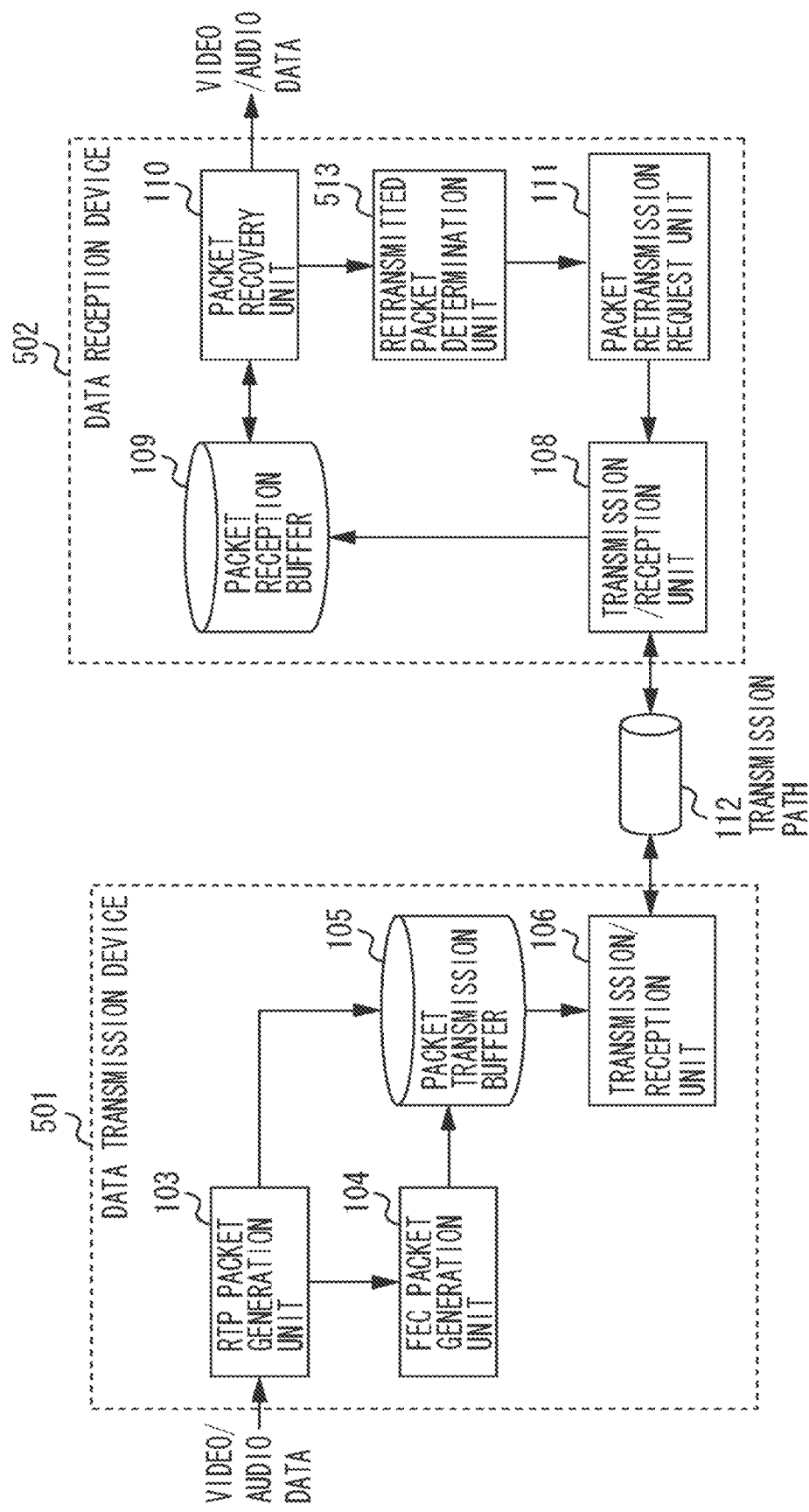
FIG. 5 is a block diagram illustrating a basic configuration of a data transmission device and a data reception device of a second exemplary embodiment.

FIG. 5 is a block diagram illustrating a basic configuration of a transmission/reception system of the present exemplary embodiment including a data transmission device 501 and a data reception device 502.

In the present exemplary embodiment, the data transmission device 501 transmits data packets such as video and voice and recovery packets (FEC packets) to the data reception device 502. The FEC packets are used by the data reception device 502 to recover a data packet that has failed to be communicated. The data reception device 502 further determines a data packet that requires retransmission based on a missing data packet that could not be recovered by the recovery packet, and transmits a retransmission request packet to the data transmission device 501. Both the data transmission device 501 and the data reception device 502 are communication apparatuses for packet communication.

As shown in FIG. 5, the data reception device 502 in the present exemplary embodiment includes a retransmit packet determination unit 513.

In the first exemplary embodiment, the data reception device 102 notifies the data transmission device 101 of the information about packets missing in the transmission path 112, so that the data transmission device 101 determines a data packet to be retransmitted. In contrast, in the present exemplary embodiment, the data reception device 502 determines a data packet to be retransmitted, and notifies the data transmission device 501 of a retransmission request packet including information (e.g., sequence number) about the data packet that is determined to be retransmitted.

Next, retransmit packet determination processing of the present exemplary embodiment is described below by referring to the flow chart of FIG. 11 and FIG. 6.

FIG. 11 is the flowchart illustrating the processing for determining a retransmit packet by the retransmit packet determination unit 513 of the present exemplary embodiment.

Figure 6:
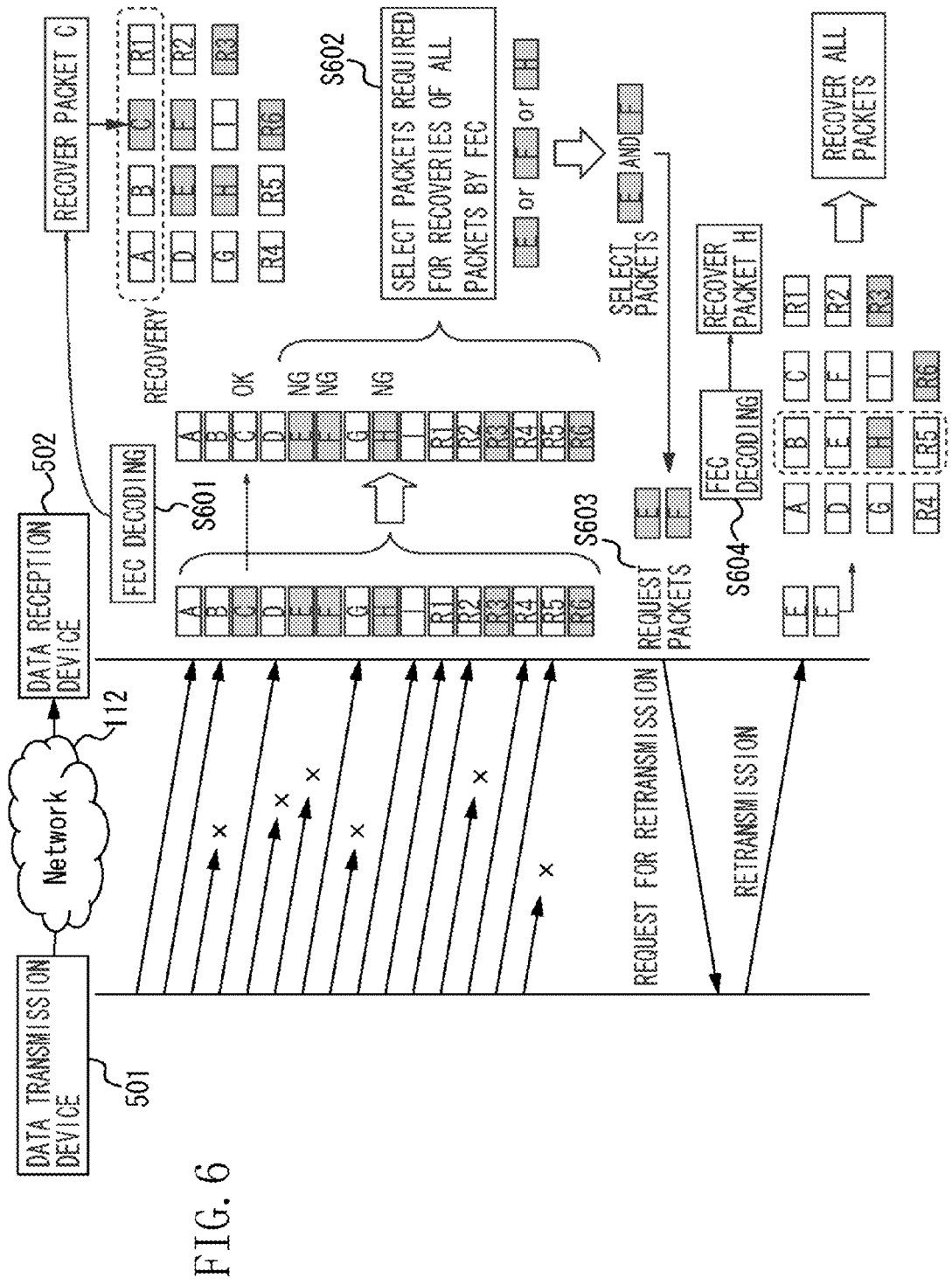
FIG. 6 illustrates a series of processes in the second exemplary embodiment from the occurrence of packet lost in the transmission path to the recovery of the lost packets by retransmission.

FIG. 6 illustrates a specific example of processing for recovering packets that are transmitted by the data transmission device 501 and missing in a transmission path.

In step S1501 in FIG. 11, the packet recovery unit 110 of the data reception device 502 detects a missing data packet. The packet recovery unit 110 of the present exemplary embodiment refers the sequence number at the header of each received packet to check for any missing data packet. More specifically, the packet recovery unit 110 detects missing data packet when there is a missing sequence number. In FIG. 6, the data transmission device 501 transmits the data packets A to I and the FEC packets R1 to R6 to the data reception device 502. It is assumed that the data packets C, E, F and H and the FEC packets R3 and R6 are missing in the transmission path 112. After the detection of the missing packets by the packet recovery unit 110, the processing proceeds to step S1502.

In step S1502, the packet recovery unit 110 of the data reception device 502 determines whether there is a missing data packet that can be recovered by the normally received data packets and FEC packets. If it is determined that there is a missing data packet which can be recovered (YES in step S1502), the processing proceeds to step S1503, if not, (NO in step S1502), the processing proceeds to step S1504. In FIG. 6, the missing data packet C can be recovered using the normally received data packets A and B and the FEC packet R1, so that the processing proceeds to step S1503.

In step S1503, the packet recovery unit 110 recovers the missing data packet that can be recovered by error correction decoding. In step S601 in FIG. 6, the packet recovery unit 110 recovers the missing data packet C. A header of the FEC packet of the present exemplary embodiment includes information about a data packet corresponding thereto. For example, the FEC packet R1 in FIG. 6 includes information, at the header thereof, indicating that the FEC packet R1 corresponds to the data packets A, B and C. The packet recovery unit 110 recovers the missing data packet C based on the information.

If there is any missing data packet that cannot be recovered by the FEC packet, the data reception device 502 notifies the retransmit packet determination unit 513 of information (sequence numbers) about the missing data packet and a missing FEC packet. In FIG. 6, the data reception device 502 notifies information about the missing data packets E, F and H and missing FEC packets R3 and R6. After the packet recovery unit 110 notifies the information about unrecoverable missing data packets and missing FEC packets, the processing proceeds to step S1504.

In step S1504 (procedure for determination), the retransmit packet determination unit 513 classifies the missing data packets into sequential recovery groups. For classifying the packets into sequential recovery groups, the retransmit packet determination unit 513 determines the other missing data packet that can be recovered when each one of the missing data packets is normally communicated. For example, the retransmit packet determination unit 513 determines the missing data packet that can be recovered if the missing data packet F is normally communicated. More specifically, in step S1504, the retransmit packet determination unit 513 determines the missing data packet that can be recovered when a first packet (missing data packet F) which is one of a plurality of packets (missing data packets) that have failed to be communicated is normally communicated. The retransmit packet determination unit 513 determines the recoverable missing data packets based on the information about data packet that corresponds to an FEC packet, the information being included in the header of the FEC packet.

In FIG. 6, there is one sequential recovery group. Thus, a normal communication of one of the missing data packets E, F and H leads to the recovery of all of the missing data packets. Each of the missing data packets has the number of sequential recoveries of three. After the classification of the missing data packets into sequential recovery groups by the retransmit packet determination unit 513, the processing proceeds to step S1505.

In step S1505 (procedure for determination), the retransmit packet determination unit 513 determines a missing data packet to be retransmitted from among the missing data packets in a sequential recovery group which has a maximum number of sequential recoveries. In FIG. 6, the retransmit packet determination unit 513 determines a data packet to be retransmitted from the missing data packets E, F and H. A number of the data packet to be retransmitted is determined based on the table such as that of FIG. 8. In step S602 in FIG. 6, the data packets E and F are determined to be retransmitted, so that the missing data packet H is not retransmitted.

In step S1505, when a first packet that is determined to recover a plurality of packets when it is normally communicated is retransmitted, the retransmit packet determination unit 513 determines the retransmit packet so that at least a part of the plurality of recoverable packets are not retransmitted. After the determination of the retransmit packet, the processing proceeds to step S1506.

In step S1506, the retransmit packet determination unit 513 assumes that all of the missing packets in the sequential recovery group from which the retransmit packet is determined are recovered, and the processing proceeds to step S1507. In FIG. 6, it is assumed that all of the missing data packets E, F and H are recovered.

In step S1507, the retransmit packet determination unit 513 determines whether all of the missing data packets are assumed to be recovered. If the retransmit packet determination unit 513 determines that all of the missing packets are assumed to be recovered (YES in step S1507), the processing proceeds to step S1508. Whereas if the retransmit packet determination unit 107 determines that there is a missing packet not yet recovered (NO in step S1507), the processing returns to step S1504. In the example illustrated in FIG. 6, it is assumed that the retransmission of the data packets E and F leads to the recovery of all of the missing data packets, and the processing proceeds to step S1508. When all of the missing data packets are not necessarily recovered, the retransmit packet determination unit 513 determines whether the missing data packet that needs to be recovered is assumed to be recovered. When there is only one sequential recovery group as in FIG. 6, the process in step S1507 may be omitted.

In step S1508, the retransmit packet determination unit 513 notifies the packet retransmission request unit 111 of the identification information (e.g., sequence numbers) of the retransmitted data packets determined in step S1505. The packet retransmission request unit 111 generates a retransmission request packet based on the identification information about the retransmitted data packets. Then, the transmission/reception unit 106 transmits the retransmission request packet generated by the packet retransmission request unit 111 to the data transmission device 501. In step S603 in FIG. 6, the retransmission request packet for the data packets E and F among the missing data packets E, F and H is transmitted. When the retransmission request packet is received, the data transmission device 501 retransmits the data packets E and F. Then, the data reception device 502 recovers the missing data packet H using the data packets B and E and the FEC packet R5.

In FIG. 6, both of the retransmitted data packets E and F are normally received, but the normal reception of one of the data packets can also lead to the recovery of all of the missing data packets. Only one data packet (e.g., data packet E) among the three missing data packet E, F, and H may be determined to be retransmitted twice, in addition to determining two different data packets (e.g., data packets E and F) as the retransmit packets as described above.

In this way, the data reception device 502 can determine a data packet for retransmission request. Further, a load on the data transmission device 501 can be reduced by determining the packet which requires retransmission in the data reception device 502.

Next, a third exemplary embodiment according to the present invention is described below, focusing on the difference from the first and second exemplary embodiments. In the first and second exemplary embodiments, an example is described in which one sequential recovery group is included and the normal reception of one retransmitted data packet among a plurality of missing data packets can lead to the recovery of the other missing data packets. In contrast, in the present exemplary embodiment, an example in which a plurality of sequential recovery groups is included is described below in detail. When there is the plurality of sequential recovery groups, the normal reception of a plurality of retransmitted data packets are necessary for the recovery of all of the missing data packets. It is the data reception device 502 that determines the retransmitted data packets in the present exemplary embodiment. The transmission/reception system of the present exemplary embodiment has the basic configuration similar to that shown in FIG. 5. As described in the first exemplary embodiment, however, the data transmission device 101 may determine the retransmitted data packet.

Figure 9:
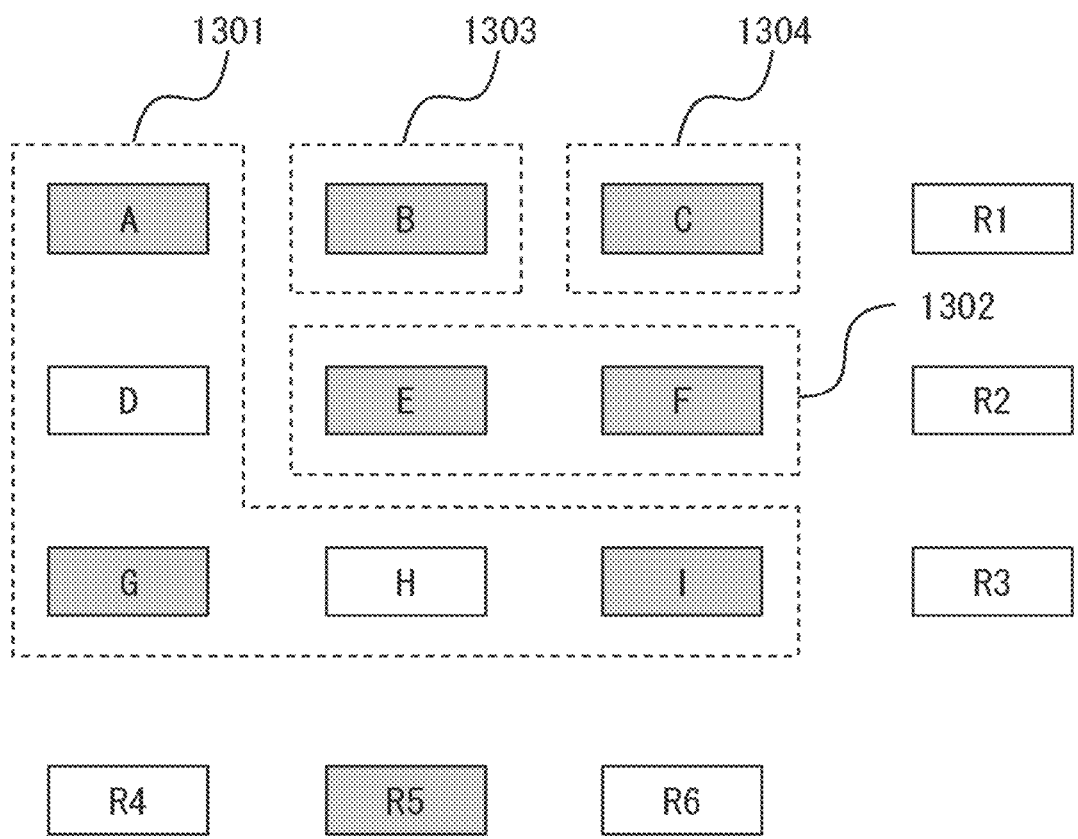
FIG. 9 illustrates an example of the FEC packet generation from the data packets arranged in a matrix of three rows and three columns.

FIG. 9 illustrates the missing of the data packets A, B, C, E, F, G, and I and the FEC packet R5. In missing patterns in the first and second exemplary embodiments, for example as shown in FIGS. 3 and 7, all of the missing data packets have the number of sequential recoveries that is equal to the number of the missing data packets. In contrast, in the missing pattern shown in FIG. 9, all of the missing data packets have the number of sequential recoveries that is smaller than the number of the missing data packets. Accordingly, to recover all of the missing data packets, the normal communication of a plurality of retransmitted data packets is required.

In FIG. 9, the data packets A, G, and I belong to the same sequential recovery group. As described above, a sequential recovery group is composed of missing data packets that can be mutually recovered in sequence. The missing data packets in one sequential recovery group have the same number of sequential recoveries. The data packets A, G, and I each have the same number of sequential recoveries of three. The normal communication of one of the data packets among the data packets A, G, and I can lead to the recovery of all data packets in the sequential recovery group.

Similarly, the missing data packets E and F belong to the same sequential recovery group. The missing data packets B and C each belong to different sequential recovery groups. In the missing pattern in FIG. 9, the normal communication of the retransmitted missing data packet B does not lead to the recovery of the other missing data packets.

When there are a plurality of sequential recovery groups, the retransmit packet determination unit 513 classifies missing data packets into the sequential recovery groups, and determines a data packet to be retransmitted from among the missing data packets in a sequential recovery group which has a maximum number of sequential recoveries. Then, the retransmit packet determination unit 513 assumes that all of the missing data packets in the sequential recovery group which has the maximum number of sequential recoveries are recovered, and classifies the missing data packets that are not recovered yet into the sequential recovery groups. After this, the similar processing is repeated to determine a data packet to be retransmitted from among the missing data packets in a sequential recovery group which has the maximum number of sequential recoveries.

The retransmit packet determination unit 513 of the present exemplary embodiment repeats the determinations of a retransmitted data packet according to the above procedure until all of the missing data packets that need to be recovered are assumed to be recovered.

Next, the classification of data packets into the sequential recovery groups by the retransmit packet determination unit 513 is described below. The retransmit packet determination unit 513 calculates missing data packets that can be recovered when each of the missing data packets are normally communicated.

For example, in FIG. 9, when the missing data packet A is normally communicated, the data packets G and I can be recovered, whereas when the missing data packet G is normally communicated, the data packets A and I can be recovered. Similarly, when the missing data packet I is normally communicated, the data packets A and G can be recovered. Thus, the retransmit packet determination unit 513 determines that the data packet A, G, and I belong to the same sequential recovery group.

Similarly, when the missing data packet E is normally communicated, the data packet F can be recovered, whereas when the missing data packet F is normally communicated, the data packet E can be recovered. Thus, the retransmit packet determination unit 513 determines that the data packet E and F belong to the same sequential recovery group.

The normal communication of the data packet B does not lead to any recovery of a missing data packet, which means there is no other missing data packet that belongs to the same sequential recovery group with the data packet B. The same consideration is given to the data packet C.

The above classification provides four sequential recovery groups in FIG. 9, namely a group 1301 composed of the data packets {A, G, I} having the number of sequential recoveries of three, a group 1302 composed of the data packets {E, F} having the number of sequential recoveries of two, a group 1303 composed of the data packet {B} having the number of sequential recoveries of one, and a group 1304 composed of the data packet {C} having the number of sequential recoveries of one. The retransmit packet determination unit 513 determines a retransmitted data packet from the sequential recovery group {A, G, I} having the maximum number of sequential recoveries among the above sequential recovery groups. The retransmit packet determination unit 513 may determine a plurality of retransmitted data packets according to the number of sequential recoveries.

The retransmit packet determination unit 513 assumes that all of the missing data packets in the sequential recovery group having the maximum number of sequential recoveries are recovered, and classifies the other packets into sequential recovery group. Then, the retransmit packet determination unit 513 determines a retransmitted data packet from the sequential recovery group which has a maximum number of sequential recoveries. After this, similar processing is repeated so that all of the missing data packets are recovered. In a case where there is no need to recover all of the missing data packets, the process may be terminated.

When the missing data packets have priorities, the retransmit packet determination unit 513 may determine a sequential recovery group from which a retransmitted data packet is determined in order of priority.

In the missing patterns described above, when a normal communication of a certain missing data packet (e.g., data packet A) can lead to the recovery of the other missing data packet (e.g., data packet G), the normal communication of the missing data packet G can lead to the recovery of the missing data packet A. Therefore, all of the missing data packets that can be recovered mutually by a normal communication of one of the missing data packets belong to the same sequential recovery group.

There is a case, however, where although a normal communication of one missing data packet A leads to the recovery of the missing data packet B, the normal communication of the missing data packet B does not lead to the recovery of the missing data packet A. This occurs, for example, when the data packets B, C, E, F, G, and H and the FEC packet R4 are missing in the configuration as shown in FIG. 2. In such an error pattern, for example, the normal communication of the missing data packet H leads to the recovery of the missing data packet G, but does not lead to the recovery of the other missing data packets B, C, E and F.

In contrast, the normal communication of the missing data packet E leads to the recovery of all of the missing data packets B, C, E, F, G, and H. In such a case, the retransmit packet determination unit 513 classifies the missing data packets into a sequential recovery group composed of the missing data packets B, C, E, and F and another sequential recovery group composed of the missing data packets G and H. Each of the missing data packets B, C, E and F has the number of sequential recoveries of six, and each of the missing data packets G and H has the number of sequential recoveries of two. The retransmit packet determination unit 513 of the present exemplary embodiment determines a data packet to be retransmitted from among the missing data packets B, C, E, and F, in which it is assumed that the retransmission leads to the recovery of the missing data packets G and H. Hence, the retransmit packet determination unit 513 does not determine a data packet to be retransmitted from among the sequential recovery group composed of missing data packets G and H. However, to reduce processing load, the data packet to be retransmitted may be determined from each of the sequential recovery groups.

The determination of a retransmitted data packet of the present exemplary embodiment is described below by referring to FIGS. 11 and 9.

FIG. 11 is the flowchart illustrating the processing for determining a retransmit packet by the data reception device 502 of the present exemplary embodiment.

In step S1501, the packet recovery unit 110 detects a lost packet (missing data packet) by monitoring the sequence numbers of received packets. In FIG. 9, the packet recovery unit 110 detects the missing of data packets A, B, C, E, F, G and I and the FEC packet R5 among the transmitted data packets A to I and the FEC packets R1 to R6. When the packet recovery unit 110 detects the missing packets (Yes in step S1501), the processing proceeds to step S1502, if not (NO in step S1501), the detection of a missing data packet is repeated.

In step S1502, the packet recovery unit 110 determines a missing data packet that can be recovered by error correction decoding. In other words, in step S1502, the packet recovery unit 110 determined whether the missing data packet can be recovered using an FEC packet (recovery packet). When the packet recovery unit 110 determines that there is data packets that can be recovered by error correction decoding (YES in step S1502), the processing proceeds to step S1503, and the missing data packets is recovered. More specifically, the packet recovery unit 110 recovers the missing data packet using the normally received data packet and FEC packet.

Whereas the packet recovery unit 110 determines there is no missing data packet that can be recovered by error correction decoding (NO in step S1502), the processing proceeds to step S1504. In the error pattern in FIG. 9, there is no missing data that can be recovered using the FEC packet, so that the processing proceeds to step S1504. Further, the packet recovery unit 110 notifies the retransmit packet determination unit 513 of the information (e.g., sequence numbers) of the missing data packets that could not be recovered by error correction decoding.

In step S1504 (procedure for determination), the retransmit packet determination unit 513 classifies the missing data packets that could not be recovered by the packet recovery unit 110 into sequential recovery groups. The classification is performed as described above. For classifying the packets into sequential recovery groups, the retransmit packet determination unit 513 determines the other missing data packet that can be recovered when each one of the missing data packets is normally communicated. For example, the retransmit packet determination unit 513 determines missing data packets that can be recovered if the missing data packet A is normally communicated. More specifically, in step S1504, the retransmit packet determination unit 513 determines missing data packets which can be recovered by normal communication of a first packet (missing data packet A) of a plurality of packets that have failed to be communicated. In FIG. 9, the plurality of packets is classified into four sequential recovery groups 1301, 1302, 1303 and 1304.

In step S1505 (procedure for determination), the retransmit packet determination unit 513 determines a data packet to be retransmitted from among the missing data packets in a sequential recovery group which has a maximum number of sequential recoveries. In FIG. 9, the retransmit packet determination unit 513 determines a data packet to be retransmitted from the sequential recovery group (group 1301) composed of the missing data packets A, G, and I. For example, it is assumed that missing data packets A and G are determined as the retransmitted data packets. In step S1505, when a first packet that is determined to recover a plurality of packets when it is normally communicated is retransmitted, the retransmit packet determination unit 513 determines the retransmit packet so that at least apart of the plurality of recoverable packets are not retransmitted.

In step S1506, the retransmit packet determination unit 513 assumes that all of the missing packets in the sequential recovery group which has the maximum number of sequential recoveries are recovered. In other words, the retransmit packet determination unit 513 assumes that all of the missing packets in the sequential recovery group that correspond to the retransmitted data packet are recovered by the retransmitted data packet determined in step S1505. In FIG. 9, it is assumed that the retransmitted data packets A and G recover all of the missing data packets A, G, and I in the sequential recovery group (group 1301).

In step S1507, the retransmit packet determination unit 513 determined whether all of the missing data packets are recovered. In other words, the retransmit packet determination unit 513 determined whether all of the missing data packets are recovered on the assumption that all of the missing data packets in the sequential recovery group are recovered.

In step S1507, when there is no need to recover all of the missing data packets, the retransmit packet determination unit 513 determines whether all of the data packets which need to be recovered can be recovered. If it is determined that not all of the data packets can be recovered (NO in step S1507), the processing returns to step S1504, and the similar processing is performed on the missing data packets that are not assumed to be recovered.

In step S1504, the retransmit packet determination unit 513 classifies the missing data packets that are not assumed to be recovered into sequential recovery groups. In step S1505, the retransmit packet determination unit 513 determines a data packet to be retransmitted from the missing data packets in the sequential recovery group which has the maximum number of sequential recoveries. In step S1506, the retransmit packet determination unit 513 assumes that all of the missing packets in the sequential recovery group which has the maximum number of sequential recoveries are recovered. Then, in step S1507, the retransmit packet determination unit 513 determines whether all of the missing data packets are assumed to be recovered. More specifically, the retransmit packet determination unit 513 determines a packet that is retransmitted with the retransmit packet determined in step S1505 from the plurality of missing data packets that have failed to be communicated except those that are assumed to be recoverable in step S1506.

In FIG. 9, the missing data packets B, C, E, and F are not assumed to be recovered, so that the processing returns to step S1504. In step S1504, the missing data packets B, C, E, and F are classified into the sequential recovery groups. The retransmit packet determination unit 513 determines a packet that can be recovered based on the normal communication of a second packet from among the plurality of packets B, C, E, and F that cannot be recovered when the first packets (missing data packets A and G) are normally communicated. In this example, these missing data packets are all determined to be in the same sequential recovery group.

Similarly, in step S1505, the retransmit packet determination unit 513 determines a packet to be retransmitted from among the missing data packets B, C, E, and F. In this example, the missing data packets B and E are determined as the retransmitted data packets. When the first and second packets (missing data packets A, G, B and E) which are determined that a plurality of packets can be recovered by normally communication thereof are retransmitted, the retransmit packet determination unit 513 determines a retransmit packet as follows. The retransmit packet determination unit 513 determines a retransmit packet so that at least a part of the plurality of packets (missing data packets B, C, E, and F) that are determined to be recovered by the normal transmission of the second packets (missing data packets B and E) is not retransmitted.

In step S1506, it is assumed that the retransmitted data packets B and E recover all of the missing data packets B, C, E, and F in the corresponding sequential recovery group. Then in step S1507, it is determined that all of the missing data packets can be recovered. In step S1507, when the retransmit packet determination unit 513 determines that all of the missing data packets can be recovered, the processing proceeds to step S1508.

In step S1508, the retransmit packet determination unit 513 notifies the packet retransmission request unit 111 of the identification information (e.g., sequence numbers) of the retransmitted data packets. In FIG. 9, the identification information about the missing data packets A, G, B, and E is notified. Then, the packet retransmission request unit 111 generates a retransmission request packet so that the data packets that are determined as the retransmitted data packets are retransmitted. The transmission/reception unit 108 transmits the retransmission request packet to the data transmission device 501.

In the above example, the data packets are arranged in a matrix of three rows and three columns to generate FEC packets, but may be arranged in other configurations.

Figure 10:
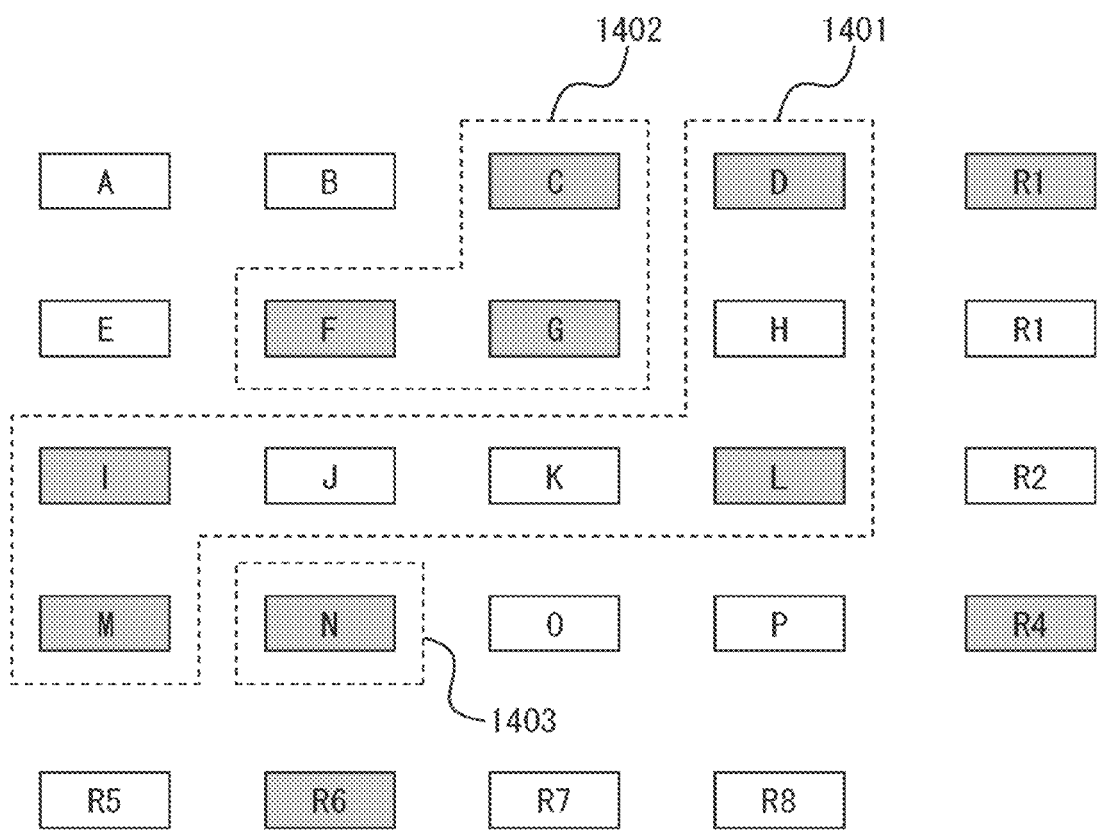
FIG. 10 illustrates an example of the FEC packet generation from the data packets arranged in a matrix of four rows and four columns.

For example, another example in which data packets are arranged in a matrix of four rows and four columns to generate FEC packets as shown in FIG. 10 is described below by referring to the flow chart of FIG. 11.

In step S1501 in FIG. 11, the packet recovery unit 110 detects missing data packets. In FIG. 10, the packet recovery unit 110 detects the missing of the data packets C, D, F, G, I, L, M, and N and the FEC packets R1, R4 and R6.

In step S1502, the packet recovery unit 110 determines that none of the missing data packets can be recovered by the FEC packets, and proceeds to step S1504. The FEC packets of the present exemplary embodiment include information about corresponding data packets at the headers thereof. For example, the FEC packet R1 in FIG. 10 has the information, in the header thereof, indicating that the FEC packet R1 corresponds to the data packets A, B, C, and D. The packet recovery unit 110 determines a missing data packet that can be recovered, based on the information in the header of the FEC packet.

In step S1504, the retransmit packet determination unit 513 classifies the missing data packets into sequential recovery groups. In FIG. 10, the missing data packets are classified into three sequential recovery groups, namely, a sequential recovery group 1401 composed of the data packets {D, I, L, M} having the number of sequential recoveries of four, a sequential recovery group 1402 composed of the data packets {C, F, G} having the number of sequential recoveries of three, and a sequential recovery group 1403 composed of the data packet {N} having the number of sequential recoveries of one.

In step S1505, the retransmit packet determination unit 513 determines a packet to be retransmitted from among the missing data packets in the sequential recovery group 1401. In FIG. 10, for example, it is assumed that the missing data packets I and L are determined as the retransmitted data packets. In step S1506, after the determination of the retransmitted data packets, it is assumed that all of the missing data packets (D, L, I and M) in the sequential recovery group 1401 are recovered.

In step S1507, the retransmit packet determination unit 513 determines whether all of the missing data packets can be recovered. In FIG. 10, as described above, it is assumed that the missing data packets D, L, I, and M can be recovered among the missing data packets C, D, F, G, I, L, M, and N. However, the missing data packets (C, F, G, and N) in the other sequential recovery groups are left un-recovered, so that the processing returns to step S1504, and the missing data packets C, F, G, and N are classified into sequential recovery groups. In FIG. 10, the missing data packets C, F, G and N are classified into a sequential recovery group 1402 composed of the data packets C, F, and G, and another sequential recovery group 1403 composed of the data packet N. In this example, the constitutions of the other sequential recovery groups do not change before and after the assumption of the recovery of the sequential recovery group 1401.

Similarly, a data packet to be retransmitted is determined from among the missing data packets C, F, and G in the sequential recovery group 1402 which has the maximum number of sequential recoveries. In FIG. 10, the missing data packets C and F are determined as the retransmitted data packets. Then a data packet to be retransmitted is determined from among the missing data packets in the sequential recovery group 1403. In FIG. 10, the missing data packet N is determined as the retransmitted data packet.

In step S1508, the retransmit packet determination unit 513 notifies the packet retransmission request unit 111 of the identification information (sequence numbers) about the data packet which is determined as the retransmitted data packet. In FIG. 10, the identification information about the missing data packets I, L, C, F, and N is notified. The packet retransmission request unit 111 generates the retransmission request packet based on the notified identification information. The transmission/reception unit 108 transmits the retransmission request packet to the data transmission device 501.

When the retransmission request packet is received, the data transmission device 501 reads the data packets (I, L, C, F, and N) to be retransmitted from the packet transmission buffer 105 based on the identification information about the retransmit packets, and retransmits the requested packets.

In FIG. 10, there are eight missing data packets, the number of data packets that are actually retransmitted may be five. In the above example, two data packets are retransmitted from among the missing data packets D, I, L, and M in the sequential recovery group 1401, but the normal communication of one of the missing data packets leads to the recovery of the other missing data packets. Accordingly, in FIG. 10, the number of data packets that are actually retransmitted may be minimized to three.

As described above, the data reception device 502 of the present exemplary embodiment causes the transmission/reception unit 108 to receive a recovery packet (FEC packet) and a data packet that are used to recover a missing data packet (failed packet). The packet recovery unit 110 determines a data packet, from among the missing data packets (failed packets), that cannot be recovered by a recovery packet. The retransmit packet determination unit 513 determines a data packet that can be recovered based on the reception of a first data packet from among the plurality of data packets that cannot be recovered.

When the retransmission of the first data packet that is determined to recover the plurality of missing data packets is requested, the data packet that requires retransmission is determined so that at least a part of the missing data packets that are determined as recoverable is not retransmitted.

As described above, the present invention may be applicable to the case where the number of data packets that cannot be recovered by the recovery packet (FEC packet) exceeds a predetermined number of packets.

Accordingly, the increase in the volume of communication due to the retransmission of missing data packets can be suppressed.

In the present exemplary embodiment, after a retransmitted data packet in a sequential recovery group which has the maximum number of sequential recoveries is determined, it is assumed that the missing data packets in the sequential recover group are all recovered. Then the other missing data packets are classified again into the sequential recover groups. According to this configuration, the number of retransmitted data packets may further be reduced, for example, when the constitutions of the other sequential recovery groups are changed on the assumption that all of the missing data packets in one sequential recovery group are recovered. Instead, a retransmitted data packet may be determined from each of the sequential recovery groups that are originally classified. Accordingly, the processing load for determining retransmitted data packets can be reduced.

When there is no need to recover all of the missing data packets in the sequential recovery group, the retransmitted data packet determination is not performed on the group. Thus, the increase in the volume of communication due to retransmitted data packets can be further reduced.

In the present exemplary embodiment, the data reception device 502 determines a retransmitted data packet, but as described in the first exemplary embodiment, a data transmission device may determine a retransmitted data packet.

In a case where a data transmission device determines a retransmitted data packet, the data transmission device includes the retransmit packet determination unit 107, like the data transmission device 101 of FIG. 1. The transmission/reception unit 106 of the data transmission device 101 transmits a recovery packet and a data packet used by the data reception device 102 to recover a failed (lost) data packet to the data reception device 102. The transmission/reception unit 106 also receives a retransmission request of data packets. The retransmit packet determination unit 107 determines a data packet (missing data packet) that can be recovered by the data reception device 102 based on the reception of the first data packet, from among the plurality of data packets that are requested for retransmission.

Further, when the first data packet that is determined to recover the plurality of data packets is retransmitted, the retransmit packet determination unit 107 determines a retransmitted data packet so that at least a part of the recoverable data packets is not retransmitted.

As described above, the present invention may be applicable to the case where the number of retransmission request data packets exceeds a predetermined number of packets. Accordingly, the increase in the volume of communication due to the retransmission of missing data packets can be suppressed. Further, the effect of the exemplary embodiment of the present invention can be obtained regardless of functions provided in the data packet reception device by performing the determination processing of a packet to be retransmitted on a data packet transmission side.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described by referring to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-313400 filed Dec. 9, 2008, which is hereby incorporated by reference herein in its entirety.

What is claimed is:

1. A communication apparatus which can communicate a data packet, a recovery packet used to recover a data packet that failed to be communicated, and a retransmit packet for the data packet that failed to be communicated, the communication apparatus comprising:
    a determining unit configured to determine, when a first packet of a plurality of packets that failed to be communicated is normally communicated, a packet that can be recovered, from among the plurality of the packets that failed to be communicated based on the first packet and the normally communicated recovery packet; and
    a retransmit determination unit configured to determine not to retransmit at least a part of the plurality of packets that can be recovered, when the first data packet is retransmitted which is determined to recover a plurality of data packets if it is normally communicated.

2. A communication apparatus which can communicate a data packet and a recovery packet used to recover a data packet that failed to be communicated, the communication apparatus comprising:
    a determining unit configured to determine, when a first packet of a plurality of packets that failed to be communicated is normally communicated, a packet that can be recovered, from among the plurality of the packets that failed to be communicated based on the first packet and the normally communicated recovery packet; and
    a retransmit determination unit configured to determine a packet to be retransmitted with the first packet from the plurality of packets that failed to be communicated, except the packet that can be recovered.

3. A communication apparatus for packet communication, comprising:
    a determining unit configured to determine a packet that can be recovered when a first packet of a plurality of packets that failed to be communicated is normally communicated; and
    a retransmit determination unit configured to determine a retransmit packet so that at least a part of the plurality of packets that can be recovered is not retransmitted, when the first packet that is determined to recover a plurality of packets if it is normally communicated is retransmitted.

4. The communication apparatus according to claim 3, wherein the retransmit determination unit determines a number of packets to be retransmitted with the first packet from among the packets that can be recovered, according to a number of the packets that can be recovered when the first packet is normally communicated.

5. The communication apparatus according to claim 3, wherein the determining unit determines a packet that can be recovered based on the first packet and the recovery packet that is communicated to recover the failed packets and normally communicated.

6. The communication apparatus according to claim 3, further comprising:
    an obtaining unit configured to obtain an error rate corresponding to a number of the packets that failed to be communicated,
    wherein when a number of packets which have a second error rate that is higher than a first error rate and are determined to be recoverable, is a first number of packets, the retransmit determination unit determines a number of retransmit packets to be smaller than a number of retransmit packets in a case where the error rate is the first error rate and a number of packets that are determined to be recoverable is the first number of the packets.

7. The communication apparatus according to claim 3, further comprising:
an obtaining unit configured to obtain an error rate corresponding to a number of the packets that failed to be communicated,
wherein when the error rate is a second error rate that is higher than a first error rate, the retransmit determination unit determines the retransmit packet so that a packet which includes moving image data that is not coded by referring to the other frame of data is retransmitted, from among the packets that failed to be communicated.

8. The communication apparatus according to claim 3, further comprising:
an obtaining unit configured to obtain delay time information about delay time required for a packet to be transmitted and received,
wherein when the obtaining unit obtains delay time information about first delay time, and then obtains delay time information about second delay time which is longer than the first delay time, and when a number of packets that are determined to be recoverable is a first number of packets, the retransmit determination unit determines the retransmit packet so that a second number of packets are retransmitted, from among the first number of packets that are determined to be recoverable, and
when the obtaining unit obtains the delay time information about first delay time, and then obtains delay time information about third delay time which is longer than the second delay time, and when the number of packets that are determined to be recoverable is the first number of packets, the retransmit determination unit determines the retransmit packet so that a third number of packets which is smaller than the second number of packets are retransmitted, from among the first number of packets that are determined to be recoverable.

9. The communication apparatus according to claim 3, wherein the retransmit determination unit determines whether to retransmit the packets that failed to be communicated according to whether the packets that failed to be communicated includes moving image data that is coded by referring to the other frame of data.

10. The communication apparatus according to claim 3, further comprising:
an obtaining unit configured to obtain delay time information about delay time required for a packet to be transmitted and received,
wherein when the obtaining unit obtains delay time information about first delay time, and then obtains delay time information about second delay time which is longer than the first delay time, the retransmit determination unit determines the retransmit packet so that a packet which includes moving image data that is coded by referring to the other frame of data and a packet which includes moving image data that is not coded by referring to the other frame of data are retransmitted, from among the packet that are determined to be recoverable, and
when the obtaining unit obtains the delay time information about the first delay time, and then obtains delay time information about third delay time which is longer than the second delay time, the retransmit determination unit determines the retransmit packet so that a packet which includes moving image data that is not coded by referring to the other frame of data is retransmitted, from among the packet that are determined to be recoverable.

11. The communication apparatus according to claim 3,
wherein the determining unit determines a packet that can be recovered when a second packet is normally communicated, from among a plurality of packets that cannot be recovered when the first packet is normally communicated, and
the retransmit determination unit determines the retransmit packet so that at least a part of the plurality of packets that are determined to be recoverable when the second packet is normally communicated is not retransmitted, when the first and second packets that are determined to recover the plurality of packets if they are normally communicated are retransmitted.

12. A transmission apparatus, comprising:
a transmission unit configured to transmit a recovery packet which is used by a reception device to recover a data packet that has failed to be communicated, and a data packet to the reception device;
a reception unit configured to receive a request for retransmitting a data packet;
a determining unit configured to determine a data packet that can be recovered by the reception device based on reception of a first data packet, from among a plurality of the data packets requested for retransmission, and
a retransmit determination unit configured to determine a data packet to be retransmitted so that at least a part of the plurality of packets that are determined to be recoverable is not retransmitted, when a number of the data packets requested for retransmission exceeds a predetermined number and when the first data packet that is determined to recover a plurality of data packets by the determining unit is retransmitted.

13. A reception device, comprising:
a reception unit configured to receive a recovery packet which is used to recover a data packet that failed to be communicated, and a data packet;
an identifying unit to identify a data packet that cannot be recovered by the recovery packet, from among the data packet that failed to be communicated;
a determining unit configured to determine a data packet that can be recovered based on reception of a first data packet, from among a plurality of data packets that cannot be recovered; and
a retransmit determination unit configured to determine a data packet which is required to be retransmitted so that at least a part of the plurality of data packets that are determined to be recoverable is not retransmitted, when a number of the data packets that cannot be recovered by the recovery packets exceeds a predetermined number and when retransmission of the first data packet that is determined to recover a plurality of data packets by the determining unit is requested.

14. A method for communication performed by a communication apparatus which can communicate a data packet, a recovery packet used to recover a data packet that failed to be communicated, and a retransmit packet for the data packet that failed to be communicated, the method comprising:
determining, when a first packet of a plurality of packets that failed to be communicated is normally communicated, a packet that can be recovered, from among the plurality of the packets that failed to be communicated based on the first packet and the normally communicated recovery packet; and
determining not to retransmit at least a part of the plurality of packets that can be recovered, when the first data packet is retransmitted which is determined to recover a plurality of data packets if it is normally communicated.

15. A non-transitory storage medium which stores a program to cause a computer which can communicate a data packet, a recovery packet used to recover a data packet that failed to be communicated, and a retransmitted packet for the data packet that failed to be communicated to execute a method comprising:

determining, when a first packet of a plurality of packets that failed to be communicated is normally communicated, a packet that can be recovered, from among the plurality of the packets that failed to be communicated based on the first packet and the normally communicated recovery packet; and determining not to retransmit at least a part of the plurality of packets that can be recovered, when the first data packet is retransmitted which is determined to recover a plurality of data packets if it is normally communicated.

16. A communication method performed by a communication apparatus for packet communication, the method comprising:

determining a packet that can be recovered when a first packet of a plurality of packets that failed to be communicated is normally communicated; and determining a retransmit packet so that at least a part of the plurality of packets that can be recovered is not retransmitted, when the first packet that is determined to recover a plurality of packets if it is normally communicated and retransmitted.

* * * * *